United States Patent
Keller et al.

(10) Patent No.: US 8,039,112 B2
(45) Date of Patent: Oct. 18, 2011

(54) INTERLAYER FILMS FOR LAMINATED GLAZING CONTAINING SILICA WITH SPECIFIC REFRACTIVE INDEX

(75) Inventors: Uwe Keller, Bonn (DE); Martin Steuer, Liederbach (DE); Takashi Wakui, Okayama (JP); Nobuhiro Moriguchi, Okayama (JP)

(73) Assignees: Kuraray Europe GmbH, Frankfurt am Main (DE); Kuraray Co., Ltd., Okayama (JP)

( * ) Notice: Subject to any disclaimer, the term of this patent is extended or adjusted under 35 U.S.C. 154(b) by 200 days.

(21) Appl. No.: 12/594,737

(22) PCT Filed: Apr. 4, 2008

(86) PCT No.: PCT/EP2008/054094
§ 371 (c)(1),
(2), (4) Date: Oct. 5, 2009

(87) PCT Pub. No.: WO2008/122608
PCT Pub. Date: Oct. 16, 2008

(65) Prior Publication Data
US 2010/0124647 A1    May 20, 2010

(30) Foreign Application Priority Data
Apr. 5, 2007   (EP) ..................................... 07105692

(51) Int. Cl.
*B32B 17/10* (2006.01)
*B32B 27/42* (2006.01)
*C03C 27/12* (2006.01)
*C08K 3/36* (2006.01)

(52) U.S. Cl. ........ 428/436; 428/219; 428/220; 428/331; 428/437; 428/524; 428/525

(58) Field of Classification Search .................. 428/219, 428/220, 436, 437, 524, 525
See application file for complete search history.

(56) References Cited

U.S. PATENT DOCUMENTS

| 2,467,342 | A | 4/1949 | Seymour |
| 5,307,438 | A | 4/1994 | Bilkadi et al. |
| 7,348,062 | B2 * | 3/2008 | Yuan ............................ 428/437 |
| 2006/0058439 | A1 | 3/2006 | Keller |

FOREIGN PATENT DOCUMENTS

| DE | 19756274 A1 | 7/1999 |
| DE | 10 2004 043 907 A1 | 3/2006 |
| EP | 0185863 A1 | 7/1986 |
| EP | 0227633 A2 | 1/1987 |
| EP | 0928818 A2 | 7/1999 |
| JP | 11060290 A | 3/1999 |
| WO | 01/43963 A1 | 6/2001 |
| WO | 02/40578 A1 | 5/2002 |
| WO | 03/097347 A1 | 11/2003 |

* cited by examiner

*Primary Examiner* — D. S. Nakarani
(74) *Attorney, Agent, or Firm* — Brooks Kushman P.C.

(57) ABSTRACT

Interlayer films useful for laminated glass contain a polyvinyl acetal (A), at least on plasticizer (B), fumed silica (C) and at least one basic compound (D), wherein the difference of refractive index between fumed silica (C) and plasticized polyvinyl acetal (A+B) is 0.015 or less, and the weight ratio of C/(A+B) is 2.7-60/100.

13 Claims, No Drawings

INTERLAYER FILMS FOR LAMINATED GLAZING CONTAINING SILICA WITH SPECIFIC REFRACTIVE INDEX

CROSS-REFERENCE TO RELATED APPLICATION

This application is the U.S. national phase of PCT Appln. No. PCT/EP2008/054094 filed Apr. 4, 2008 which claims priority to EP application 07105692.3 filed Apr. 5, 2007.

BACKGROUND OF THE INVENTION

1. Field of the Invention

The present invention relates to an interlayer film containing silica with specific refractive index to provide such film with improved mechanical properties at low haze.

2. Description of the Related Art

Interlayer films for laminated glazing are long known in the art and mostly produced from plasticized polyvinyl butyral by an extrusion process. Nearly all windshields for cars or airplanes are produced from laminated glazing; in addition laminated glazing is often used as safety glazing for architectural applications.

To control the adhesion of the interlayer film in laminated glazing, a lot of research has been done. Besides the use of special plasticizer or adhesion control agents, the addition of filler materials such as inorganic compounds, especially silica has been proposed.

U.S. Pat. No. 2,467,342 describes the addition of colloidal silica to polyvinyl acetal resins to cast films. The colloidal silica disclosed in this publication must be in sol form in order to produce a clear film without haze. These casting processes are not a useful for the industrial production of polyvinyl acetal films.

EP 0 227 633 discloses the use of silica as nucleating agent in interlayer films for fire resistant laminated glazing. This interlayer film comprises a plasticizer, an organic phosphate as a char-forming component, and silica as a nucleating agent. In order to prevent undesirable haze of the interlayer film due to the addition of silica, only silica having a refractive index within ±0.03 of the plasticized formulation can be used. The refractive index of the plasticized formulation depends largely on the plasticizer composition, which includes organic phosphates. Therefore only certain combinations of silica and plasticizer mixtures are usable and disclosed in this publication. Organic phosphates are no longer used as plasticizer due to environmental concerns.

Fumed silica like the disclosed Cab-O-Sil M5 show refractive indices $n_D$ of 1.460, whereas PVB-films using the common non-aromatic plasticizer in standard amounts show refractive indices $n_D$ close to 1.482 at 20° C. In order to avoid an unacceptable haze value, EP 0227633 teaches to use only small amounts of silica (at most 2.5% by weight based on the film) and silica with a small difference in refractive indices with the PVB. The mechanical properties of interlayer films are nearly unaffected by the addition of such low amounts of silica. The addition of large amounts of silica according to EP 0 227 633 would lead to an unacceptable haze value due to the difference in refractive indices.

In addition, the refractive index of interlayer film varies with temperature, for example between 10° C. to 50° C., refractive indices $n_D$ between 1.486 and 1.470 can be measured. Laminated glazing should be transparent over a broad range of temperature. The disclosed combinations of silica and plasticizer are not suitable for applications which are subject to temperature changes like cars or buildings, since below 20° C., the difference in refractive indices between silica and the interlayer film will even increase. It is therefore important to match the refractive index of the fumed silica as much as possible with the refractive index of the interlayer film at moderate temperatures like 20° C. in order to balance the increase of haze at higher and lower temperatures.

EP 1 042 121 discloses the use of small amounts of fumed silica in polyvinyl butyral films to enhance the adhesion between interlayer film and glass. In order to maintain the haze of the interlayer film in an acceptable range, only 0.001 to 0.25% by weight of silica is added to the plasticized polyvinyl butyral. By adding such small amounts of silica, no effect on the mechanical properties such as the tensile strength of the interlayer film can be detected.

JP11-060290 discloses the addition of silica and other metal oxides to polyvinyl acetal in combination with the metal salt of a carboxylic acid with 5 to 25 carbon atoms. In this publication, an upper limit of 0.5% by weight of silica is proposed in order to increase the adhesion of an interlayer film to glass and at the same time maintain an acceptable haze value. If used in the disclosed amounts, silica has practically no effect on the mechanical properties of the interlayer film.

Most of the published literature addresses the problem that by adding silica to plasticized polyvinyl acetals, the resulting interlayer films will obtain an unacceptable haze value for optical applications. Whether this unwanted haze value is due to the silica particles themselves or due to higher moisture sensitivity remains unclear.

So far, only small amounts of silica have been used to increase the adhesion between glass and interlayer film if at the same time an opaque appearance of the interlayer film has to be avoided. Furthermore, if silica is used in higher amounts than those described by the above-mentioned publications, not only unacceptable haze values but also discoloration of the film may result due to the acid properties of the silica. Acidic conditions will lead to partial degradation of the acid sensitive PVB-polymer at the high temperatures used for PVB-film extrusion.

SUMMARY OF THE INVENTION

It was an object of the invention to improve the mechanical properties such as the tensile strength of an interlayer film based on polyvinyl acetal by adding silica without causing an unacceptable haze value. These and other objects are accomplished by providing an interlayer film useful for laminated glass comprising polyvinyl acetal (A), at least one plasticizer (B), fumed silica (C) and at least one basic compound (D), characterized in that the difference of refractive index between fumed silica (C) and plasticized polyvinyl acetal (A+B) is 0.015 or less and the weight ratio of C/(A+B) is 2.7/100 to 60/100.

DETAILED DESCRIPTION OF THE PREFERRED EMBODIMENTS

The refractive index of plasticized polyvinyl acetal (A+B) is usually in the range of 1.470 to 1.490 at 20° C. if non-aromatic plasticizers are used. In order to achieve good transparency, the use of fumed silica (C) with a difference of refractive index of 0.015 or less, preferably of 0.0001 to 0.015 to the refractive index of the plasticized polyvinyl acetal (A+B) is preferred. More preferably, upper limit of the difference of refractive index is 0.01, and lower limit of the difference of refractive index is 0.001.

The polyvinyl acetal (A) used in the present invention is produced by reacting polyvinyl alcohol with at least one aldehyde. Preferred aldehydes for this reaction are formaldehyde, acetaldehyde, propionaldehyde and butyraldehyde.

Most preferably, polyvinyl butyral (PVB) is used as polyvinyl acetal. Polyvinyl butyral is a terpolymer with acetate, hydroxyl and acetal units. Preferably, the polyvinyl butyral used in the present invention comprises 0 to 2% by weight acetate units, 15 to 25% by weight hydroxyl units and 85 to 76% by weight butyral units.

Furthermore, partly cross-linked PVB, obtainable by reaction of polyvinyl alcohol with a mixture of at least one aldehyde and at least one dialdehyde and/or aldehyde containing carboxylic groups according DE 10 143 109 or WO 02/40578 A1, can be used.

As basic compound (D), metal salts of organic carboxylic acids comprising 1 to 15 carbon atoms are preferred. Especially useful are alkali or earth alkali salts of acetic acid like sodium acetate, magnesium acetate or potassium acetate. It is also possible to add inorganic compounds like sodium hydroxide or potassium hydroxide, but since excess amounts of such strong bases may lead to chemical degradation of the polyvinyl acetal or the plasticizer, the use of inorganic compounds is less preferred. The basic compound (D) is usually employed in an amount of 0.005 to 2% by weight, preferably 0.05 to 1% by weight, calculated on the mixture (A+B).

Commercially available PVB-resin for PVB-film production is often stabilized against acidic degradation with small amounts of a base such as sodium or potassium hydroxide. Extruded PVB-film from such resin has therefore a certain alkalinity, measurable as alkaline titer. The addition of fumed silica will neutralize a certain amount of the base contained in the resin which may result in alkaline titers below 3 or even acid titer. By the usual titration method however, acid titer will result in a measured alkaline titer of "0", since negative values are not included in the range of the alkaline titer method. To prevent unwanted coloration of the film, interlayer films according to the invention preferably have an alkaline titer of more than 3, preferably more than 10 and more preferably more than 20 or 30. The upper limit of the alkaline titer value is not of particular importance, but should not exceed 100.

Fumed silica (C) can be used in an amount of 2.7 to 60, preferably 3.0 to 40 or 3.5 to 40, more preferably 10 to 25 and most preferably 7.5 to 15 parts per 100 parts per weight of the mixture (A+B). The fumed silica may further be doped by one or more compounds selected from the group consisting of $Al_2O_3$, $TiO_2$, $ZrO_2$ and MgO and can comprise 0.1 to 20% by weight (calculated on the silica) of at least one of these metal oxides. Such compounds are commercially available from Degussa GmbH, Germany.

The silica used in the present invention can further be characterized by its surface properties and the particle size. The preferred fumed silica used in the present intention has BET-surface areas of 50 to 300 m²/g and/or a primary particle size of 7 to 30 nm.

The haze value of the plasticized film according to the invention should be in the range of that of commercial available interlayer film. Interlayer films according to the invention show preferable haze value of 2.0% or less (0 to 2.0%), preferably 1.2% or less (0 to 1.2%) and most preferably 0.01 to 1.0%. These values were measured according to ASTMD 1003 or JIS K7105 at an interlayer film having a thickness of 0.76mm. If the interlayer film is thinner or thicker, haze values have to be calculated to correspond to a thickness of film of 0.76 mm.

In addition to the mentioned haze values, interlayer films according to the invention show a preferable Yellowness delta b Index of 5 or less (0 to 5), preferably 0.01 to 3, more preferably 0.01 to 1 and most preferably 0.01 to 0.5. The Yellowness delta b Index is measured as described in the examples at an interlayer film having a thickness of 0.76 mm. If the interlayer film is thinner or thicker, the Yellowness delta b Index has to be calculated to correspond to a thickness of film of 0.76 mm.

The interlayer film of the present invention may comprise 20 to 100 parts, preferably 30 to 80 parts plasticizer (B) per 100 parts polyvinyl acetal. Any plasticizer generally used for the production of interlayer films from polyvinyl acetales can be employed in the present invention. Especially useful are triethylenglycol-di-2-ethylbutyrate (3GH), triethylenglycol-heptanoate (3G7) or triethylenglycol-di-2-ethylhexanoate (3G8) as well as the corresponding tetraethylene glycol and oligoethylene glycol derivatives and esters with carboxylic acids containing 8 to 12 carbon atoms. Furthermore, dihexyladipate (DHA), dioctyladipate (DOP), dibutylsebacate (DBS) and dialkylphtalates can be used. All plasticizers can be used alone or in any mixture thereof.

The use of plasticizer mixtures of a "standard" plasticizer like the above-mentioned compounds and a co-plasticizer is also possible. Such mixtures are disclosed in DE 102004043907 A1 and comprise at least one of the above-mentioned "Standard" plasticizers and 1 to 99% by weight, preferably 1 to 50% by weight, more preferably 1 to 10% by weight (calculated on the plasticizer mixture) of at least one co-plasticizer having the chemical formulae I or II

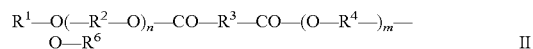

With $R^1$, $R^5$, $R^6$: are independently being H or an aliphatic or aromatic residue with 1 to 12 carbon atoms, $R^3$: may be a direct bond, or a bivalent aliphatic or aromatic residue with 1 to 12 carbon atoms, $R^2$, $R^4$: are independently H or an aliphatic or aromatic residue with 1 to 12 carbon atoms, n, m: are independently an integer of 1 to 10, preferablly 1 to 5.

$R^2$ and $R^4$ can represent units of ethylene, propylene or butylene groups, i.e. the compound may contain groups derived from ethylene oxide, propylene oxide or butylene oxide and/or oligomers thereof.

$R^1$, $R^5$ and $R^6$ are preferably methyl-, ethyl-, propyl-, butyl- or hexyl groups.

The carboxylic acids of the ester according formula I are in general carboxylic acids comprising 1 to 18 carbon atoms, especially benzoic acid, cyclohexanecarboxylic acid, acetic acid or propionic acid. As carboxylic acids of the ester according to formula II the following dicarboxylic acids are preferred: oxalic acid, malonic acid, glutaric acid, succinic acid, adipic acid, pimelic acid, azelaic acid, sebacic acid, terephthalic acid, phthalic acid, isophthalic acid and all stereo isomers of cyclohexandicarboxylic acid.

Namely, di-(2-butoxyethyl)-adipate (DBEA), Di-(2-butoxyethyl)-sebacate (DBES), di-(2-butoxyethyl)-azelate, di-(2-butoxyethyl)-glutarate, di-(2-butoxyethoxyethyl)-adipate (DBEEA), di-(2-butoxyethoxyethyl)-sebacate (DBEES), di-(2-butoxyethoxyethyl)-azelate, di-(2-butoxyethoxyethyl)-glutarate, di-(2-hexoxyethyl)-adipate, di-(2-hexoxyethyl)-sebacate, di-(2-hexoxyethyl)-azelate, di-(2-hexoxyethyl)-glutarate, di-(2-hexoxyethoxyethyl)-adipate, di-(2-hexoxyethoxyethyl)-sebacate, di-(2-hexoxyethoxyethyl)-azelate, di-(2-hexoxyethoxyethyl)-glutarate, di-(2-butoxyethyl)-phthalate and/or di-(2-butoxyethoxyethyl)-phthalate can be used as co-plasticizer.

It is also possible to use the plasticizer according formula I or II as single plasticizer in pure form (100%) without any additional plasticizer.

The compositions for interlayer films according to the present invention can further contain the usual additives known to the skilled person, such as small amounts of water, UV-absorbing compounds (for example benzotriazoles such as Tinuvin 328, 326, P, 327), antioxidants such as phenolic antioxidants, adhesion control agents (ACA), optical brighteners, stabilizers such as HALS, dyes and/or pigments.

The mechanical properties of the interlayer film according to the invention are enhanced compared with an interlayer film of identical composition, but without silica. In terms of "tensile stress at 100% of elongation" and/or "tensile stress at 50% of elongation", the stress of an interlayer film according to the invention can be at least 1.2 times, preferably 1.2 to 30.0 times, more preferably 1.2 to 20.0 times and most preferably 1.2 to 10.0 times of that of an interlayer film with the same composition without fumed silica (C).

The mechanical properties of interlayer films based on polyvinyl acetal vary with temperature and are usually adjusted by choice of the chemical composition and the amount of the resin and plasticizer to cope with the usual environmental conditions. The glass transition temperature Tg of the interlayer film is therefore of particular importance.

The difference between the glass transition temperature of the interlayer film according to the invention, Tga, and the glass transition temperature of an interlayer film with the same composition, but without fumed silica (C), Tgb, should be within 3 degrees Celsius. ($|Tga-Tgb|<=3$20 C.)

Especially preferred are interlayer films for laminated glass wherein:
(a) the tensile stress at 50% and/or 100% of elongation of said interlayer film is at least 1.20 times that of an interlayer film without fumed silica (C) and
(b) the difference between the glass transition temperature of said interlayer film, Tga, and the glass transition temperature of an interlayer film with the same composition, but without fumed silica (C), Tgb, is within 3 degrees Celsius. ($|Tga-Tgb|<=3$20 C.)

The interlayer film according to the invention can be produced by feeding the fumed silica and the polyvinyl acetal simultaneously and the plasticizer charged with additives and the basic compound separately to an extruder to form a plasticized melt that is extruded from a slit die. It is also possible to first mix the polymer and the plasticizer and add silica and the basic compound to this mixture. The addition of the fumed silica to a molten mixture containing the basic compound by means of a side feeder attached to the extruder is also possible. The extrusion process itself is well known in the art and disclosed for example in EP 0 185 863 B1, WO 03/097347 A1 or WO 01/43963 A1.

The silica used in the interlayer films according to the invention influences the adhesion between the interlayer film and glass surface. The adhesion of interlayer films is—regardless of the application—carefully adjusted to a compromise of penetration resistance and bonding to the glass panes. The influence of silica can be levelled by adjusting the amount of adhesion control agents. As adhesion control agents, the same compounds as the basic compounds (D) may be used, i.e. alkali and/or earth alkali metal salts of organic carboxylic acids comprising 1 to 15 carbon atoms are preferred. Especially useful are sodium acetate, magnesium acetate or potassium acetate. Adhesion control agents may be used in 0.0001 to 0.01 weight-%, based on the total mixture.

A different approach of adjusting the adhesion of interlayer film to glass would be to avoid the contact between silica-containing films and glass on at least one side of the film.

Another object of the invention are multilayer films consisting of at least one layer or film comprising polyvinyl acetal (A') and at least one plasticizer (B') and at least one layer or film comprising polyvinyl acetal (A), at least one plasticizer (B), fumed silica (C) and at least one basic compound (D), characterized in that the difference of refractive index between fumed silica (C) and plasticized polyvinyl acetal (A+B) is 0.015 or less and the weight ratio of C/(A+B) is 2.7/100 to 60/100.

All features already discussed for silica-containing film as monolayer could apply to the silica-containing layer or film in the multilayer film.

The polyvinyl acetal (A') and (A) and the plasticizer (B') and (B) may be the same or different in regard of amount used or chemical composition. Preferred is the use of the same materials in an identical amount.

The layer or film comprising polyvinyl acetal (A') and at least one plasticizer (B') may contain the usual additives known to the skilled person, such as small amounts of water, UV-absorbing compounds (for example benzotriazoles such as Tinuvin 328, 326, P, 327), antioxidants such as phenolic antioxidants, adhesion control agents (ACA), optical brighteners, stabilizers such as HALS, dyes and/or pigments.

The multilayer film may consist of one layer or film containing silica and one layer or film without silica. In another embodiment of the invention, at least one (preferred: one) silica-containing layer or film is sandwiched between at least two (preferred: two) layers or films without silica. The surface of such multilayer film has the properties of a "standard" monolayer film without silica, but the mechanical properties such as tensile strength of the overall multilayer film are improved by the silica-containing layer or film.

The silica-containing core layer or film of the multilayer film can be produced as already described. The multilayer film according to this invention can be produced by mechanical combination of the films, but may also be produced by co-extrusion of the layers.

The multilayer film may have a thickness of multiples of 0.38 mm as usual in production of laminated glazing. Therefore the layer or film containing silica can be as thin as 0.1 mm and as thick as needed to achieve the desired mechanical properties.

The interlayer and multilayer films according to the invention can be used for the production of laminated glazing, especially in windshields of cars, busses and aircrafts, for buildings and in sound-absorbing walls.

EXAMPLES

1) Measurements

Alkaline titer 3-4 g of PVB-film is dissolved in 100 ml mixture of ethyl alcohol/THF (80:20) on a magnetic stirrer over night. 10 ml of diluted hydrochloric acid (c=0.01 mol/l) are added. Excess hydrochloric acid is potentiometrically titrated with a solution of tetrabutylammonium hydroxide in 2-propanol (TBAH, c=0.01 mol/l) using a titroprocessor (e.g. by Metrohm) against a blank sample. Alkaline titer is calculated as:

ml(0.01 mol/lHCl) per 100 g of sample=(ml TBAH$_{blank}$-ml TBAH$_{sample}$)×100/sample weight in g.

Tensile properties were determined according to DIN EN ISO 527-1 and DIN EN ISO 527-3, on strip specimens of the dimension 15 mm×120 mm using an increased elongation rate of 200 mm/min.

Yellowness delta b Index of the film was determined measuring a laminate of the film between two plies of 2 mm standard float glass against a reference glass pair on an optical photometer Hunterlab, Colorquest XE" in the L,a,b-system: b value (laminate)−b value (glass pair)=delta b.

Haze of the film was measured according to ASTM 1003 at 20° C. on a Hunterlab "Colorquest XE" in laminated form i.e. laminated between two plies of 2 mm clear float glass without haze.

Method for measurement of refractive index of fumed silica

Fumed silica is dried for 2 hours at 105° C. in an oven. A suspension containing 2% of the dried fumed silica in a suitable nonpolar solvent is filled in a sealed vial that is stored for 4 hours at 80° C. During that time the vial is occasionally agitated in order to achieve good homogenization. This suspension is transferred into a cuvette for optical measurement and the light transmission at 550 nm is recorded as a function of sample temperature. The temperature for which the light transmission passes through its maximum (minimum haze) is taken and the refractive index of the solvent alone measured on a digital refractometer (such as ABBEMAT-WR of Kernchen GmbH) at the same temperature is set equal to the refractive index of the fumed silica. Suitable solvents are e.g. limonene, plasticizers such as Palatinol 10-P, 3G8 or other and are selected according to the expected refractive index of the fumed silica.

Measurement of Refractive Index of PVB-Film

A circular sample of PVB-film with flat surface is measured in the sample mould of a high accuracy automatic refractometer such as "ABBEMAT-WR" of Kernchen GmbH at 20° C.

Glass transition temperature Tg

Glass transition temperature is understood as the maximum of the loss factor (tan 67) curve as measured by dynamic mechanical thermal analysis (DMTA) on a film sample at 1Hz with an amplitude of 0.05% and at a heating rate of 2K/min.

2a) Preparation of interlayer film (monolayer)

PVB-films of the examples according to the invention and the comparative examples were prepared under identical conditions by an extrusion process with a melt temperature close to 200° C., forcing the molten mixture through a slit die. PVB polymer and optionally fumed silica were simultaneously fed into the hopper, whereas the plasticizer containing UV-absorber in dissolved form is added as a separate liquid component. The basic compound was fed into the extruder via a separate inlet as an aqueous solution. Film thickness was 0.76 mm in all examples/comparative examples.

2b) Preparation of Interlayer Film (Multilayer)

Multilayer films were prepared by sandwiching one (core) layer according to example W5 or comparative example C10 with a thickness of 0.38 mm between two layers according to comparative example C1 with a thickness of 0.20 mm. The resulting multilayer film had a thickness of 0.78 mm and was tested for its optical and mechanical properties in the same way as the monolayer films.

3) Materials

Silica: Commercial grade AEROSIL® MOX 170 of DEGUSSA having pH value 3.8 and containing 1.1% Al2O3 are used for preparation of the fumed silica-containing film. Commercial grade AEROSIL® 130 of DEGUSSA having pH value 4.1 and containing no additional inorganic oxide, commercial grade CAB-O-SIL® M5 of CABOT having pH value of 4.1 and containing no additional inorganic oxide and commercial grade NIPGEL® AY-200 of TOSO-Silica having pH value of 7.0 and containing no additional inorganic oxide are also used for comparison.

TABLE 1

| | Silica | | | |
|---|---|---|---|---|
| | Aerosil MOX 170 | Aerosil 130 | CAB-O-SIL M5 | Nipgel AY-200 |
| Specific surface area (BET) | 170 | 130 | 200 | 300 |
| Primary particle size (nanometer) | 15 | 16 | 12 | 10 |
| pH value | 3.8 | 4.1 | 4.1 | 7.0 |
| Doping compound (weight-%) | $Al_2O_3$ (1.1) | — | — | — |
| Refractive index (RI) | 1.471 | 1.462 | 1.460 | 1.460 |
| Difference of RI between silica and plasticized acetal [PVB + 3G8][1] | 0.011 | 0.020 | 0.022 | 0.022 |
| Difference of RI between silica and plasticized acetal [PVB + 3G8:DBEA(1:1)][2] | 0.007 | 0.016 | 0.018 | 0.018 |

[1] Refractive index of plasticized acetal [PVB + 3G8] is 1.482
[2] Refractive index of plasticized acetal [PVB + 3G8:DEBA(1:1)] is 1.478
PVB resin: Mowital B 68/2 SF with 20.5 weight % PVOH from Kuraray Europe GmbH
Plasticizer: DBEA (Di-(2-butoxyethyl)-adipate) 3G8 (Triethylenglycol-di-2-ethylhexanoate)
Basic compound: Potassium acetate and magnesium acetate 4) Results As can be seen from the following Tables 2 through 4, interlayer films according to the invention show an improved tensile stress and acceptable values for haze and yellowness.
Table-2 [Monolayer: Single plasticizer]
Table-3 [Monolayer: Two plasticizers]
Table-4 [Three-layer: Two plasticizers]

TABLE 2

| | Example | C1 | W1 | W2 | W3 | W4 |
|---|---|---|---|---|---|---|
| Composition[5] | (A) Polyvinyl acetal[1] (weight-%) | PVB (72) | PVB (72) | PVB (72) | PVB (72) | PVB (72) |
| | (B) Plasticizer[2] (weight-%) | 3G8 (28) | 3G8 (28) | 3G8 (28) | 3G8 (28) | 3G8 (28) |
| | (C) Silica[3] (weight-%) | — | MOX 170 (2.7) | MOX 170 (3.6) | MOX 170 (14) | MOX 170 (40) |
| | (D) Basic compound[4] (weight-%) | K (0.025) Mg (0.05) | K (0.025) Mg (0.05) | K (0.025) Mg (0.05) | K (0.025) Mg (0.05) | K (0.05) Mg (0.05) |
| Properties of film | Haze [%] | 0.9 | 1.0 | 1.1 | 1.5 | 1.7 |
| | Yellowness delta b | 0.2 | 0.2 | 0.2 | 0.2 | 0.2 |
| | Tg [deg-C.] | 38 | 38 | 38 | 38 | 38 |

TABLE 2-continued

|  |  |  |  |  |  |
|---|---|---|---|---|---|
| Tensile stress at 50% of elongation [MPa] (ratio to C1) | 3.8 (1.0) | 4.6 (1.2) | 4.9 (1.3) | 9.6 (2.5) | 28 (7.4) |
| Tensile stress at 100% of elongation [MPa] (ratio to C1) | 10.5 (1.0) | 12.4 (1.2) | 13.9 (1.3) | 19.6 (1.9) | — |
| Elongation at break [%] | 202 | 173 | 158 | 130 | 58 |
| Alkaline titer | 48 | 42 | 40 | 22 | 5 |

| | Example | C2 | C3 | C4 | C5 |
|---|---|---|---|---|---|
| Composition[5] | (A) Polyvinyl acetal[1] (weight-%) | PVB (72) | PVB (72) | PVB (72) | PVB (72) |
| | (B) Plasticizer[2] (weight-%) | 3G8 (28) | 3G8 (28) | 3G8 (28) | 3G8 (28) |
| | (C) Silica[3] (weight-%) | MOX 170 (3.6) | MOX 170 (0.7) | 130 (3.6) | AY-200 (3.6) |
| | (D) Basic compound[4] (weight-%) | — | K (0.025) Mg (0.05) | K (0.025) Mg (0.05) | K (0.025) Mg (0.05) |
| Properties of film | Haze [%] | 8.5 | 1.2 | 2.7 | 11.2 |
| | Yellowness delta b | 5.1 | 0.2 | 0.3 | 0.2 |
| | Tg [deg-C.] | 38 | 38 | 38 | 38 |
| | Tensile stress at 50% of elongation [MPa] (ratio to C1) | — | 4.1 (1.1) | 5.0 (1.3) | 6.0 (1.6) |
| | Tensile stress at 100% of elongation [MPa] (ratio to C1) | — | 10.9 (1.0) | 14.6 (1.4) | 16.0 (1.5) |
| | Elongation at break [%] | — | 195 | 169 | 171 |
| | Alkaline titer | 1 | 46 | 39 | 48 |

[1]PVB: Mowital B 68/2 SF (Kuraray Europe GmbH),
[2]3G8: Triethylenglycol-di-2-ethylhexanoate,
[3]MOX: Aerosil MOX 170 (Degussa),
[4]K: Potassium acetate, Mg: Magnesium acetate tetrahydrate,
[5]Weight-% is based on plasticized acetal (A + B)

TABLE 3

| | Example | C6 | W5 | W6 |
|---|---|---|---|---|
| Composition[6] | (A) Polyvinyl acetal[1] (weight-%) | PVB (65) | PVB (65) | PVB (65) |
| | (B) Plasticizer[2] (weight-%) | G8:DBEA [1:1] (35) | 3G8:DBEA [1:1] (35) | 3G8:DBEA [1:1] (35) |
| | (C) Silica[3] (weight-%) | — | MOX 170 (2.7) | MOX 170 (6.4) |
| | (D) Basic compound[4] (weight-%) | K (0.025) Mg (0.05) | K (0.025) Mg (0.05) | K (0.025) Mg (0.05) |
| | UV-absorber[5] (weight-%) | Tinuvin 328 (0.15) | Tinuvin 328 (0.15) | Tinuvin 328 (0.15) |
| Properties of film | Haze [%] | 0.4 | 0.6 | 0.8 |
| | Yellowness delta b | 0.2 | 0.2 | 0.2 |
| | Tg [deg-C.] | 28 | 28 | 29 |
| | Tensile stress at 50% of elong. [MPa] (ratio to C6) | 0.6 (1.0) | 0.7 (1.2) | 0.8 (1.3) |
| | Tensile stress at 100% of elong. [MPa] (ratio to C6) | 1.1 (1.0) | 1.4 (1.3) | 1.9 (1.7) |
| | Elongation at break [%] | 346 | 341 | 333 |
| | Alkaline titer | 41 | 34 | 22 |
| | Example | C7 | C8 | C9 |
| Composition[6] | (A) Polyvinyl acetal[1] (weight-%) | PVB (65) | PVB (65) | PVB (65) |
| | (B) Plasticizer[2] (weight-%) | 3G8:DBEA [1:1] (35) | 3G8:DBEA [1:1] (35) | 3G8:DBEA [1:1] (35) |
| | (C) Silica[3] (weight-%) | CAB-O-SIL (6.4) | MOX 170 (6.4) | CAB-O-SIL (6.4) |
| | (D) Basic compound[4] (weight-%) | K (0.025) Mg (0.05) | — | — |
| | UV-absorber[5] | Tinuvin 328 (0.15) | Tinuvin 328 (0.15) | Tinuvin 328 (0.15) |

TABLE 3-continued

|  |  |  |  |  |
|---|---|---|---|---|
|  | (weight-%) |  |  |  |
| Properties of film | Haze [%] | 2.2 | 8.0 | 8.9 |
|  | Yellowness delta b | 0.1 | 8.2 | 5.1 |
|  | Tg [deg-C.] | 31 | — | — |
|  | Tensile stress at 50% of elong. [MPa] (ratio to C6) | 0.8 (1.3) | — | — |
|  | Tensile stress at 100% of elong. [MPa] (ratio to C6) | 2.1 (1.9) | — | — |
|  | Elongation at break [%] | 311 | — | — |
|  | Alkaline titer | 35 | 0 | 0 |

[1] PVB: Mowital B 68/2 SF (Kuraray Europe GmbH),
[2] 3G8: Triethylenglycol-di-2-ethylhexanoate, DEBA: Di-(2-buthoxyethyl)-adipate,
[3] MOX: Aerosil MOX 170(Degussa), CAB-O-SIL: CAB-O-SIL M5 (CABOT),
[4] K: Potassium acetate, Mg: Magnesium acetate tetrahydrate,
[5] Benzotriazole Tinuvin 328 (Ciba),
[6] Weight-% is based on plasticized acetal (A + B)

TABLE 4

|  | Example | C10 | W7 |
|---|---|---|---|
| Composition of core layer[6] | (A) Polyvinyl acetal[1] (weight-%) | PVB (65) | PVB (65) |
|  | (B) Plasticizer[2] (weight-%) | 3G8:DBEA [1:1] (35) | 3G8:DBEA [1:1] (35) |
|  | (C) Silica[3] (weight-%) | — | MOX 170 (10.0) |
|  | (D) Basic compound[4] (weight-%) | K (0.025) Mg (0.05) | K (0.025) Mg (0.05) |
|  | UV-absorber[5] (weight-%) | Tinuvin 328 (0.15) | Tinuvin 328 (0.15) |
| Properties of layered film | Haze [%] | 0.5 | 0.9 |
|  | Yellowness delta b | 0.2 | 0.2 |
|  | Tg [deg-C.] | — | — |
|  | Tensile stress at 50% of elongation [MPa] (ratio to C10) | 0.6 (1.0) | 1.0 (1.7) |
|  | Tensile stress at 100% of elongation [MPa] (ratio to C10) | 1.0 (1.0) | 2.1 (2.1) |
|  | Elongation at break [%] | 342 | 327 |
|  | Alkaline titer | 44 (core layer) | 17 (core layer) |

[1] PVB: Mowital B 68/2 SF (Kuraray Europe GmbH),
[2] 3G8: Triethylenglycol-di-2-ethylhexanoate, DEBA: Di-(2-buthoxyethyl)-adipate,
[3] MOX: Aerosil MOX 170(Degussa),
[4] K: Potassium acetate, Mg: Magnesium acetate tetrahydrate,
[5] Benzotriazole Tinuvin 328 (Ciba),
[6] Weight-% is based on plasticized acetal (A + B)

The invention claimed is:

1. An interlayer film for laminated glass, comprising at least one polyvinyl acetal (A), at least one plasticizer (B), fumed silica (C) and at least one basic compound (D), wherein the difference of refractive index between fumed silica (C) and plasticized polyvinyl acetal (A+B) is 0.015 or less and the weight ratio of C/(A+B) is 2.7/100 to 60/100, wherein the fumed silica (C) is doped by one or more of $Al_2O_3$, $TiO_2$, $MgO$ and $ZrO_2$.

2. The interlayer film of claim 1, wherein the basic compound (D) comprises a metal salt of an organic $C_{1-15}$ carboxylic acid.

3. The interlayer film of claim 1, wherein a film of 0.76 mm thickness has a haze value of 2.0% or less according to ASTM D 1003.

4. The interlayer film of claim 1, wherein the film has an alkaline titer of more than 3.

5. The interlayer film of claim 1, wherein the tensile stress of the film at 50% and/or 100% of elongation of said interlayer film is at least 1.2 times of that of an interlayer film with the same composition but without fumed silica (C).

6. The interlayer film of claim 1, wherein the difference between the glass transition temperature Tga of the interlayer film and the glass transition temperature Tgb of an interlayer film with the same composition but without fumed silica (C) are within 3 degrees Celsius ($|Tga-Tgb|<=3$).

7. The interlayer film of claim 1, wherein:
   a) the tensile stress at 50% and/or 100% of elongation of the said interlayer film is at least 1.2 times of as that of an interlayer film with the same composition without fumed silica (C); and
   b) the difference between the glass transition temperature Tga of said interlayer film and the glass transition temperature Tgb of an interlayer film with the same composition but without fumed silica (C) are within 3 degrees Celsius ($|Tga-Tgb|<=3$).

8. A multilayer film for laminated glass consisting of at least one layer comprising a polyvinyl acetal (A'), at least one plasticizer (B'), and at least one layer of the interlayer film of claim 1.

9. The multilayer film of claim 8, wherein at least one layer of the interlayer film of claim 1 is sandwiched between at least two layers of a film comprising a polyvinyl acetal (A') and at least one plasticizer (B').

10. A safety glass glazing comprising at least one glass pane and at least one multilayer film of claim 9.

11. A safety glass glazing comprising at least one glass pane and at least one multilayer film of claim 8.

12. A safety glass glazing comprising at least one glass pane and at least one interlayer film of claim 1.

13. The safety glass glazing of claim 12 which is a glazing selected from the group consisting of glazings for a vehicular windshield, an aircraft windshield, an aircraft widow, an architectural window, and a sound absorbing wall.

* * * * *

UNITED STATES PATENT AND TRADEMARK OFFICE
CERTIFICATE OF CORRECTION

| | | |
|---|---|---|
| PATENT NO. | : 8,039,112 B2 | Page 1 of 1 |
| APPLICATION NO. | : 12/594737 | |
| DATED | : October 18, 2011 | |
| INVENTOR(S) | : Uwe Keller | |

It is certified that error appears in the above-identified patent and that said Letters Patent is hereby corrected as shown below:

IN THE CLAIMS:

Column 14, Line 7, Claim 13:

After "an aircraft" delete "widow"
and insert -- window --.

Signed and Sealed this
Twenty-fourth Day of January, 2012

David J. Kappos
*Director of the United States Patent and Trademark Office*